July 24, 1951 — E. T. GADD — 2,561,356
APPARATUS FOR TRIMMING MOLDED ARTICLES
Filed Nov. 30, 1948 — 3 Sheets-Sheet 1
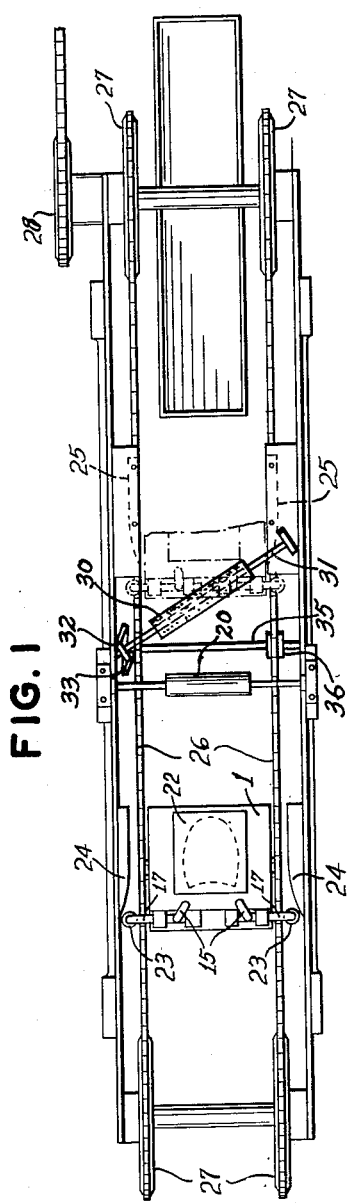
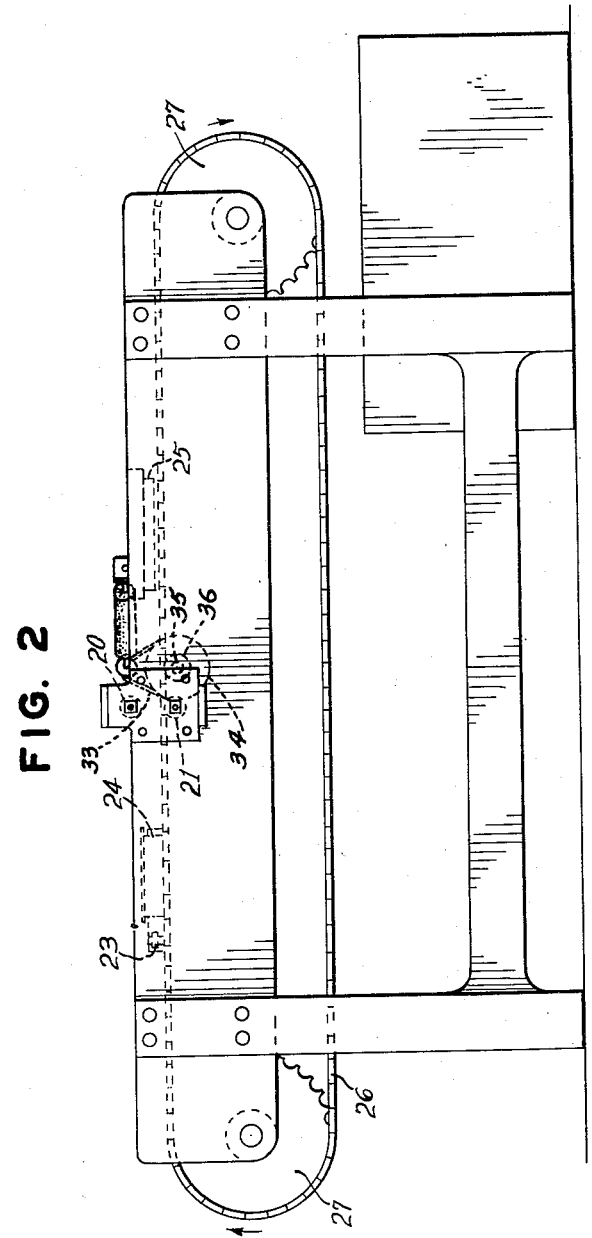
INVENTOR.
Edward T. Gadd July 24, 1951 E. T. GADD 2,561,356
APPARATUS FOR TRIMMING MOLDED ARTICLES
Filed Nov. 30, 1948 3 Sheets-Sheet 2

INVENTOR
Edward T. Gadd
BY
ATTORNEYS

July 24, 1951 E. T. GADD 2,561,356
APPARATUS FOR TRIMMING MOLDED ARTICLES
Filed Nov. 30, 1948 3 Sheets-Sheet 3

INVENTOR
*Edward T. Gadd*
BY
*Jennie Edmonds, Morton and Barrows*
ATTORNEYS

Patented July 24, 1951

2,561,356

UNITED STATES PATENT OFFICE 2,561,356

APPARATUS FOR TRIMMING MOLDED ARTICLES

Edward T. Gadd, Brooklyn, N. Y., assignor of one-half to Theodore B. Mickelson, Brooklyn, N. Y.

Application November 30, 1948, Serial No. 62,612

4 Claims. (Cl. 164—29)

This invention relates to an apparatus for trimming molded articles which is suitable for use in removing the flow from rubber or plastic heels.

When a rubber or plastic heel is removed from the mold cavity in which it has been formed, it almost always has a fin or flange projecting laterally from its upper or lower edge and extending more or less completely around the heel. This flange (commonly referred to as "flow" or "flash") is the overflow or surplus stock which has been introduced in the mold in order to be sure that the cavity will be completely filled out. Some overflow necessarily results, varying somewhat in quantity with different heels produced in the cavity of a mold, and this surplus material must be trimmed off before the heels are sold. Such a trimming operation is laborious and increases the manufacturing expense of the product.

The present invention is especially concerned with this flow trimming operation, and it aims to improve the apparatus used in this operation with a view to accomplishing this result more efficiently and economically.

The nature of the apparatus of the present invention will be evident from the following description and accompanying drawings which illustrate a specific embodiment of an apparatus falling within the broad scope of the present invention.

In the drawings,

Fig. 1 represents a plan or top view of the apparatus;

Fig. 2 represents a side view thereof;

Figure 3:
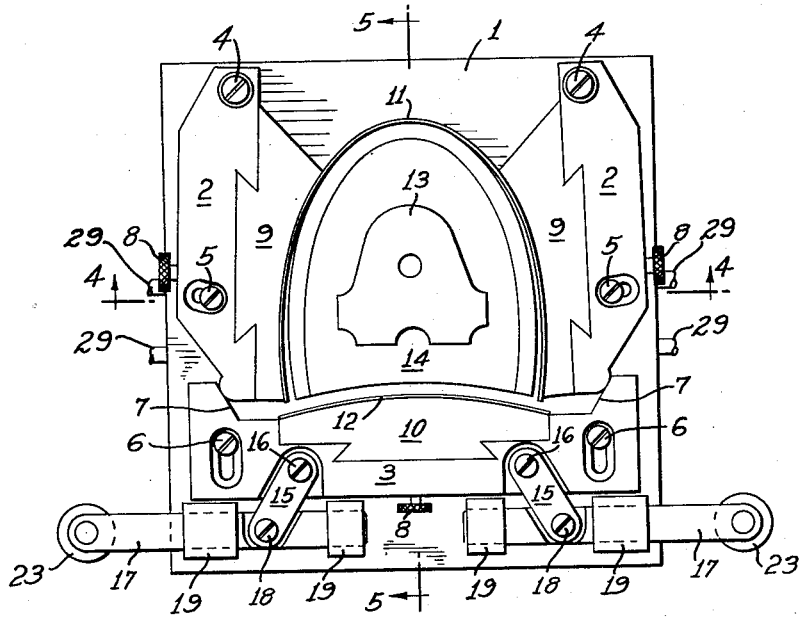
Fig. 3 represents a plan or top view of a portion of the apparatus showing details not shown in Fig. 1.
Figure 4:
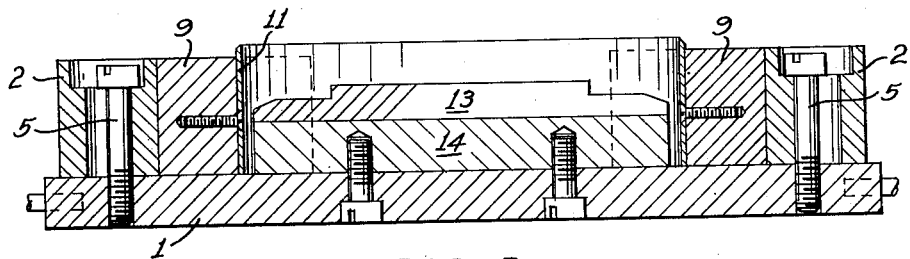
Fig. 4 represents a section along the line 4—4 of Fig. 3.
Figure 5:
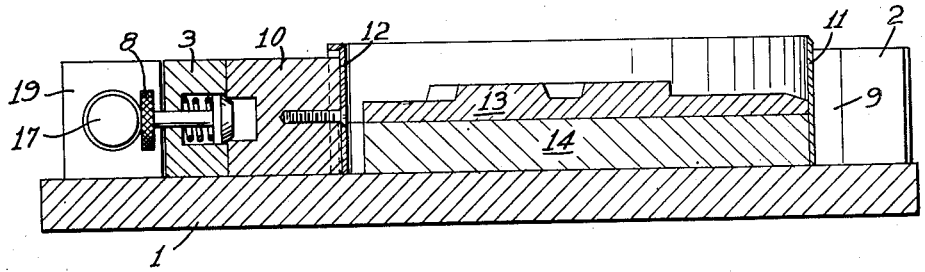
Fig. 5 represents a section taken along the line 5—5 of Fig. 3.
Figure 6:
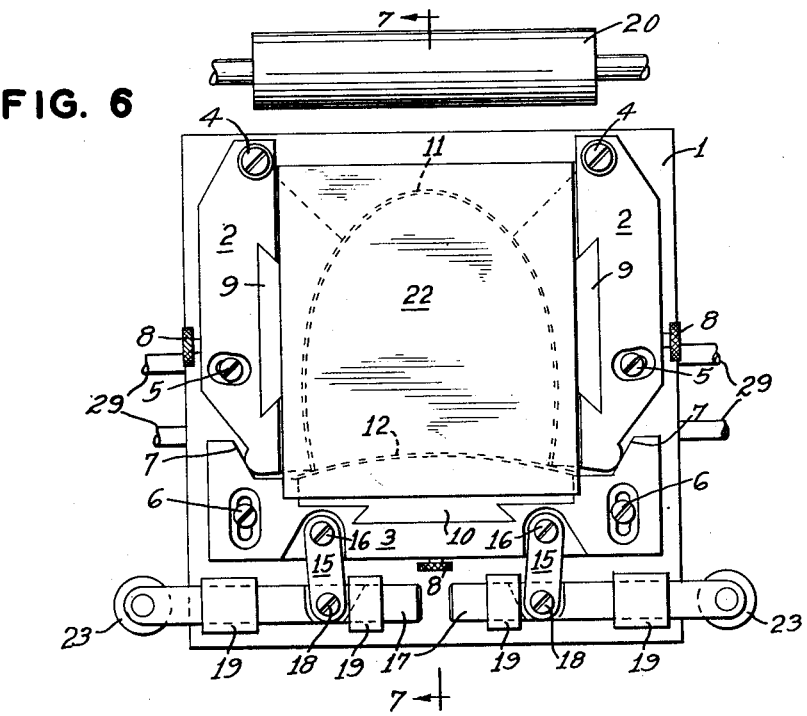
Fig. 6 represents a plan or top view of the apparatus with a heel in position ready to be trimmed.
Figure 7:
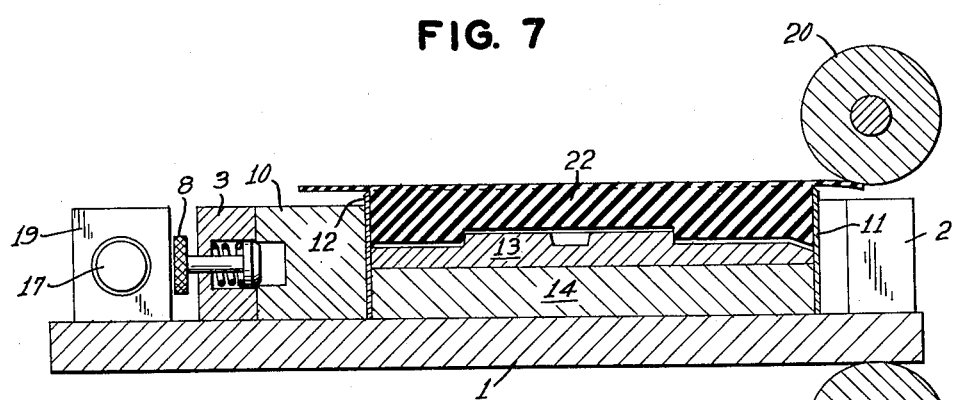
Fig. 7 represents a section along the line 5—5 of Fig. 6.
Figure 8:
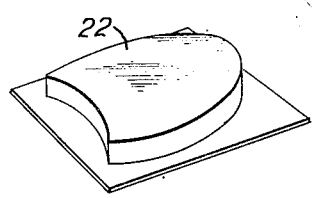
Fig. 8 represents a typical rubber heel before the flow has been removed.

In the drawings, the numeral 1 represents a mounting or bolster plate, a rectangular plate to which the working or moving parts of the apparatus are attached. The parts numbered 2 and 3 are die blocks, those numbered 2 being pivoted on the studs 4 and being guided in their radial motion by the studs 5. The inward radial motion of the die blocks 2 is imparted to them by the camming action of die block 3. The die block 3 moves linearly, guided by the studs 6, and has angular faces 7 which impart the inward radial motion to the die blocks 2.

Each of the three die blocks is dovetailed as shown, and has a locking device 8 to hold the filler blocks 9 and 10 in their proper positions. These filler blocks are dovetailed as shown to fit the corresponding dovetails of the corresponding die blocks, and are removable in order that filler blocks of other sizes may be inserted.

The numeral 11 represents a flexible knife blade rigidly attached to the filler blocks 9, the blade assuming a U-shape when the filler blocks 9 are dovetailed into the pivoted die blocks. The numeral 12 represents a breast knife blade attached to the filler block 10.

The apparatus shown in the drawings also comprises a rand plate 13, a piece of metal conforming to the shape and design of the rand of any specific design or size of heel. A rand filler plate 14, a piece of metal also conforming to the shape of any specific design or size of heel, is also provided. The thickness of the rand filler plate may vary, so as to raise or lower the rand plate in the apparatus in order that heels of various thicknesses may be accommodated.

The numerals 15 represent toggles pivoted upon the die block 3 by means of the studs 16 and upon the rods 17 by means of the studs 18. The rods 17 are provided with depending cam rollers 23 which impart a reciprocating motion thereto, the rods being guided in such motion by the bearings or sleeves 19 attached to the bolster plate 1. The rollers 23 are moved by contacting the fixed cams 24 and 25, the former cams serving to move the rollers inward and the latter serving to move the rollers outward. Also, the cams 24 are so positioned that they serve to move the toggles 15 inwardly slightly past the position of their maximum forward thrust upon the die-block 3 (i. e., slightly past the "dead-center" position), so that after the rollers 23 have completed their contact with the cams 24 the blades 11 and 12 will automatically remain in their closed positions until the rollers 23 contact the fixed cams 25.

The bolster plate 1 is carried by the endless chains 26, and is attached thereto by suitable means such as the pins 29. These chains are mounted upon sprockets 27, which are driven by suitable means 28.

The apparatus is also provided with rollers 20 and 21, suitably made of steel.

The operation of the apparatus shown is as follows: An untrimmed heel 22 is positioned upon the rand plate when the U-shaped knife blade is in its extended position and when the rods 17 are in their outward positions. As the bolster plate is carried forward by the chains 26, the rollers 23 contact the fixed cams 24, causing the knife blades to grip the heel firmly. The bolster plate is then carried between the rollers 20 and 21, the former serving to remove the flow and the latter serving to support the bolster plate. As the bolster plate then proceeds in its forward motion, the rollers 23 contact the fixed cams 25, which move the rollers 23 away from each other, thus releasing the heel, so that it may fall from the apparatus as the bolster plate passes over the sprockets. If desired, brushing means may be provided intermediate the rollers 20 and 21 and the fixed cams 25 to sweep the cutting to the side of the device before the heel has been released. Such brushing means may comprise a brush 30 mounted on shaft 31 on which is also mounted the pulley 32. Belt 33 passes over pulley 32 and also over pulley 34 which is mounted on shaft 35. This shaft also has mounted on it sprocket 36 which is driven by one of the chains 26, thereby providing the power necessary to operate the brush.

I claim:

1. A die suitable for use in removing the flow from rubber or plastic heels comprising a mounting plate, a flexible knife blade conforming to the U-shaped portion of a heel, a first die block rigidly fixed to one leg of said flexible knife blade and pivotally mounted on said plate, a second die block rigidly fixed to the other leg of said flexible knife blade and pivotally mounted on said plate, a breast knife blade conforming to the breast portion of a heel, a breast die block rigidly fixed to said breast knife blade and slidably mounted on said plate, a pair of angular faces on said breast die block for pivoting said first and second die blocks towards each other upon movement into engagement therewith to form a flow cutting blade, and means for imparting reciprocating motion to said breast die block.

2. An apparatus suitable for use in removing the flow from rubber or plastic heels comprising a mounting plate, a flexible knife blade conforming to the U-shaped portion of a heel, a first die block rigidly fixed to one leg of said flexible knife blade and pivotally mounted on said plate, a second die block rigidly fixed to the other leg of said flexible knife blade and pivotally mounted on said plate, a breast knife blade conforming to the breast portion of a heel, a breast die block rigidly fixed to said breast knife blade and slidably mounted on said plate, a pair of angular faces on said breast die block for pivoting said first and second die blocks towards each other upon movement into engagement therewith to form a flow cutting blade, conveying means connected to said plate for moving said plate, fixed means disposed in the path of travel of said plate, and means connected to said breast die block for coaction with said fixed means upon movement thereby to impart reciprocating motion to said breast die block.

3. An apparatus suitable for use in removing the flow from rubber or plastic heels comprising a mounting plate, a flexible knife blade conforming to the U-shaped portion of a heel, a first die block rigidly fixed to one leg of said flexible knife blade and pivotally mounted on said plate, a second die block rigidly fixed to the other leg of said flexible knife blade and pivotally mounted on said plate, a breast knife blade conforming to the breast portion of a heel, a breast die block rigidly fixed to said breast knife blade and slidably mounted on said plate, a pair of angular faces on said breast die block for pivoting said first and second die blocks towards each other upon movement into engagement therewith to form a flow cutting blade, endless chain conveying means connected to said plate for moving said plate, fixed cams disposed in the path of travel of said plate, and roller means connected to said breast die block for imparting reciprocating motion thereto upon movement into engagement with said fixed cams by said conveying means.

4. An apparatus suitable for use in removing the flow from rubber or plastic heels comprising a mounting plate, a flexible knife blade conforming to the U-shaped portion of a heel, a first die block rigidly fixed to one leg of said flexible knife blade and pivotally mounted on said plate, a second die block rigidly fixed to the other leg of said flexible knife blade and pivotally mounted on said plate, a breast knife blade conforming to the breast portion of a heel, a breast die block rigidly fixed to said breast knife blade and slidably mounted on said plate, a pair of angular faces on said breast die block for pivoting said first and second die blocks towards each other upon movement into engagement therewith to form a flow cutting blade, rods slidably mounted on said plate, toggles operatively interconnecting said rods with said breast die block, rollers attached to said rods, a pair of endless chains connected to said plate for moving said plate, and fixed cams positioned for operative engagement with said rollers to impart reciprocating motion to said breast die block.

EDWARD T. GADD.

REFERENCES CITED

The following references are of record in the file of this patent:

UNITED STATES PATENTS

| Number | Name | Date |
| --- | --- | --- |
| 6,444 | Boynton | May 8, 1849 |
| 13,296 | Arthur et al. | July 24, 1855 |
| 472,715 | Rogouski | Apr. 12, 1892 |
| 1,167,976 | Campbell | Jan. 11, 1916 |
| 2,101,654 | Sheehan | Dec. 7, 1937 |
| 2,168,401 | Evers | Aug. 8, 1939 |